UNITED STATES PATENT OFFICE.

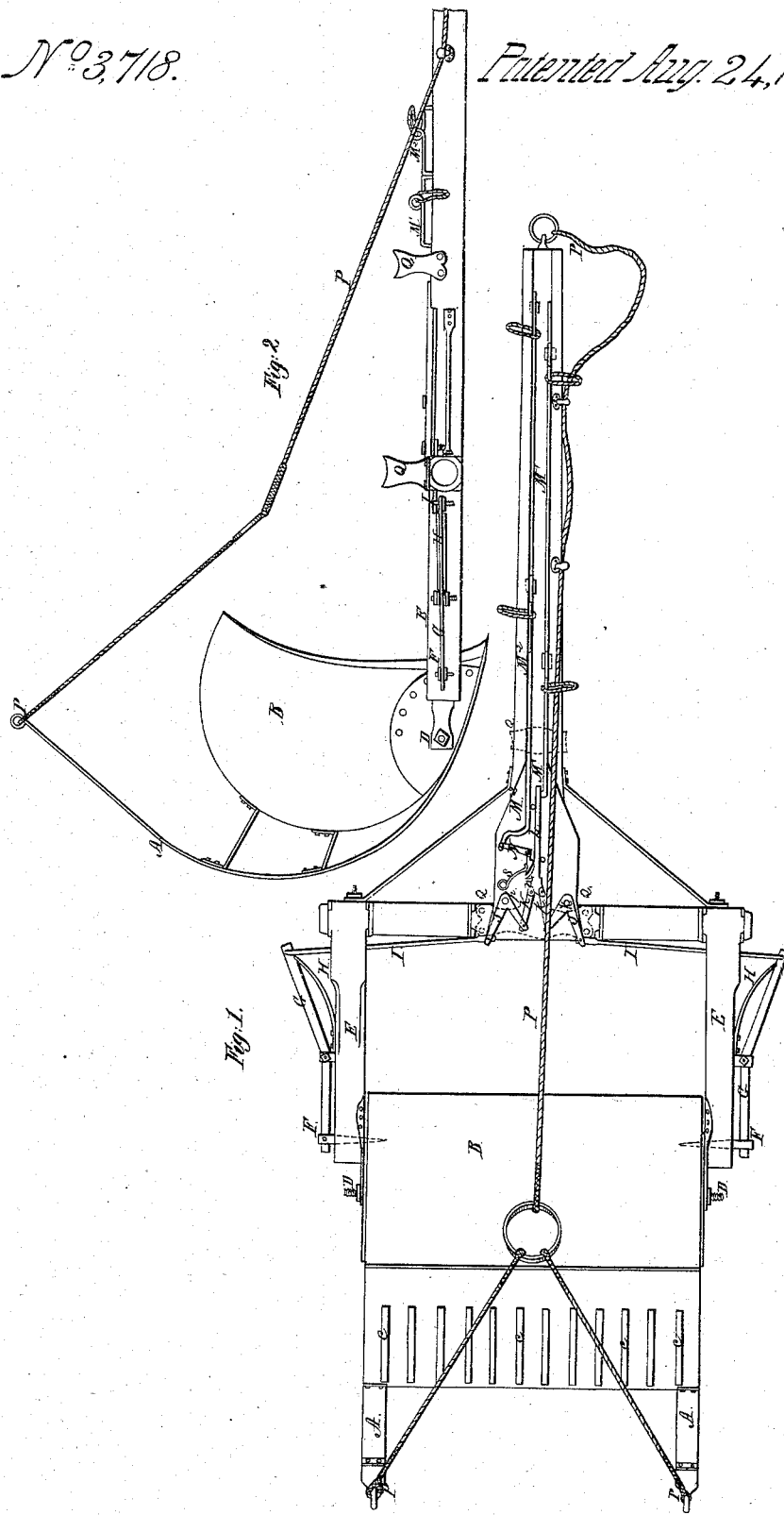

JOSEPH SMITH, OF NEAR MANSFIELD, OHIO.

IMPROVEMENT IN SCOOP-EXCAVATORS OR DREDGING-MACHINES FOR REMOVING MUD FROM THE BOTTOMS OF RIVERS, CANALS, &c.

Specification forming part of Letters Patent No. 3,718, dated August 24, 1844.

*To all whom it may concern:*

Be it known that I, JOSEPH SMITH, of near Mansfield, in the county of Richland and State of Ohio, have invented a new and useful Machine for Removing the Mud from the Bottoms of Canals, Mill-Races, Ditches, and other Places, which is described as follows, reference being had to the annexed drawings of the same, making part of this specification.

Figure 1 is a top view of the machine. Fig. 2 is a side elevation of the machine as in operation.

This machine consists of a pair of runners or skids A A, to which, at the turned-up ends, is fastened a semi-oval or semi-cylindrical or other shaped turning-scoop B, perforated with a number of parallel slits or openings $c$ to allow the water to flow through from the mud scooped up, which scoop B turns on pivots or axles D, that turn in boxes in the sides of a frame E, to which the handle or tongue is fastened.

The sides of the scoop are perforated with a segment-row of holes, into which pins F are driven by a lever G and spring H, attached to the frame, said pins passing through round apertures in the sides of the frame for holding the scoop at any required angle with the frame or with a horizontal plane while scooping, and for liberating it from the frame when it is required to reverse the position of the scoop in order to discharge it of its contents. The said pins are withdrawn from the scoop by means of a combination of bent levers G G, connecting-rods I I, angled levers J J, links K K, notched bar L, and longitudinal rods M' M with handles.

In order to withdraw the pins F from the scoop B to unlock it from the frame E, draw the longitudinal rod M' toward the outer end of the tongue. This puts the other combined parts of the fastening apparatus in motion, causing the angled levers J to vibrate on the pins $p\ p$ and the springs H to contract and the pins F to recede and the dog N to be driven into one of the notches $n$ of the notched bar L by its spring S, by which it is held in an unlocked position until the scoop be discharged. Then after the scoop is discharged and it is required to be again locked to the frame the second parallel longitudinal rod $M^2$ is drawn forward, which trips the dog N and disengages it from the notched bar L, when the force of the springs H throws the ends of the vibrating bent levers G outward and the pins F, attached thereto, inward and into the apertures in the scoop and again lock it to the frame in readiness for another operation of scooping. Previous to discharging the scoop it, is drawn up the sides of the bank on its runners A, and when at the place of deposit a rope or chain P, attached to the rear ends of the runners is drawn forward, which causes the runners and scoop to turn upon the convex sides thereof and empty the scoop of its contents. It is then returned to the canal or race by the operators laying hold of bails or handles Q on the frame and the tongue and carrying it backward, said handles being represented by dotted lines in Fig. 1. The scoop is then secured to the frames by the pins F in the manner before described. The front and lower edge of the scoop is made straight and faced with steel and brought to a cutting-edge. The sides or ends are made concave or like a sickle and sharp, and likewise faced with steel for cutting roots, &c.

What I claim as my invention, and desire to secure by Letters Patent, is—

The combination of the perforated scoop B and runners A with the levers J G, rods I K L M' and apparatus P, for discharging the scoop, constructed and operated in the manner above set forth.

JOSEPH SMITH.

Witnesses:
 WM. P. ELLIOT,
 A. E. JOHNSON.